(12) United States Patent
Aoki

(10) Patent No.: US 6,182,138 B1
(45) Date of Patent: *Jan. 30, 2001

(54) DATA DISTRIBUTION SYSTEM THAT PERFORMS LOAD BALANCING BY DIRECTLY TRANSMITTING DATA BETWEEN DISTRIBUTION SERVERS

(75) Inventor: Hiromichi Aoki, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/800,375

(22) Filed: Feb. 14, 1997

(30) Foreign Application Priority Data

Feb. 15, 1996 (JP) .................................... 8-027794

(51) Int. Cl.[7] .................................................. G06F 15/173
(52) U.S. Cl. ........................ 709/226; 709/224; 709/229
(58) Field of Search .................... 395/200.56, 200.54, 395/200.61, 200.63, 200.33; 348/7; 709/229, 226, 224, 231, 233, 203

(56) References Cited

U.S. PATENT DOCUMENTS

| | | | |
|---|---|---|---|
| 5,341,477 | * 8/1994 | Pitkin et al. | 395/200.56 |
| 5,414,455 | * 5/1995 | Hooper et al. | 348/7 |
| 5,442,390 | * 8/1995 | Hooper et al. | 348/7 |
| 5,495,426 | * 2/1996 | Waclawsky et al. | 395/200.56 |
| 5,544,313 | * 8/1996 | Shachnai et al. | 395/200.49 |
| 5,568,181 | 10/1996 | Greenwood et al. | 348/7 |
| 5,583,561 | * 12/1996 | Baker et al. | 348/7 |
| 5,740,371 | * 4/1998 | Wallis | 395/200.59 |
| 5,774,660 | * 6/1998 | Brendel et al. | 395/200.31 |
| 6,076,108 | * 6/2000 | Courts et al. | 709/227 |
| 6,078,943 | * 6/2000 | Yu | 709/105 |

FOREIGN PATENT DOCUMENTS

| 0683464A2 | * 11/1995 | (EP) | G06F/17/60 |
|---|---|---|---|
| 7-28681 | 1/1995 | (JP) . | |
| 7-200380 | 8/1995 | (JP) . | |
| 9-91230 | 4/1997 | (JP) . | |
| 9-179820 | 7/1997 | (JP) . | |

* cited by examiner

Primary Examiner—Zarni Maung
(74) Attorney, Agent, or Firm—Foley & Lardner

(57) ABSTRACT

This invention provides a data distribution system capable of changing dynamically a capability of the data distribution system. In the present invention, there are provided a plurality of distributing servers, a supplying server connected to each of the plurality of distributing servers. In the case that there is a request for a content not included in the disk unit of the distributing server, it is transmitted from the supplying server to the distributing server and concurrently the content is distributed from the distributing server to the requesting set top box.

12 Claims, 10 Drawing Sheets

| CONTENT NUMBER | CONTENT NAME | TIME LENGTH | DISTRIBUTING SERVER 20-1 | DISTRIBUTING SERVER 20-2 | DISTRIBUTING SERVER 20-3 | DISTRIBUTING SERVER 20-4 | DISTRIBUTING SERVER 20-5 |
|---|---|---|---|---|---|---|---|
| #0001 | (A) | 1.5 HOURS | ○ | ○ | | | ○ |
| #0002 | (B) | 2.0 HOURS | | | | | |
| #0003 | (C) | 0.3 HOURS | | ○ | | | ○ |
| #0004 | (D) | 0.4 HOURS | | | | | ○ |
| #0005 | (E) | 1.2 HOURS | | | ○ | ○ | |
| #0006 | (F) | 0.1 HOURS | | ○ | | | |
| #0007 | (G) | 0.4 HOURS | ○ | | | | |
| #0008 | (H) | 1.2 HOURS | | | | ○ | |
| #0009 | (I) | 0.1 HOURS | | | ○ | | ○ |
| #0010 | (J) | 1.5 HOURS | ○ | | | | |
| ... | | | | | | | |
| ... | | | | | | | |
| ... | | | | | | | |
| #nnnn | (NNN) | 2.0 HOURS | | ○ | | ○ | |

FIG.3

| | NUMBER OF STREAMS | REMAINING FILE CAPACITY |
|---|---|---|
| DISTRIBUTING SERVER 20-1 | 5 | 2GB |
| DISTRIBUTING SERVER 20-2 | 3 | 0GB |
| DISTRIBUTING SERVER 20-3 | 2 | 10GB |
| DISTRIBUTING SERVER 20-4 | 5 | 0GB |
| DISTRIBUTING SERVER 20-5 | 4 | 4GB |

DATA DISTRIBUTION SYSTEM THAT PERFORMS LOAD BALANCING BY DIRECTLY TRANSMITTING DATA BETWEEN DISTRIBUTION SERVERS

BACKGROUND OF THE INVENTION

The present invention relates to a data distribution system, and more particularly to a data distribution system having distribution servers.

A data distribution system distributes data (i.e., video data) to clients (i.e., set top boxes). The data distribution system has distributing servers which distribute data ("content") to the clients by a stream.

In the data distribution system, work load of the distributing servers is not always balanced. If some specific distributing severs are accessed more than other distributing servers, the entire performance of the system is degraded.

On the other hand, if all of the distributing servers store same contents in duplicate, too much capacity is required in the distributing servers.

SUMMARY OF THE INVENTION

In view of the foregoing problem of the conventional system, an object of the present invention is to change the distributing capability of the system dynamically.

In a data distribution system according to a first aspect of the present invention, a plurality of distributing servers serve data. The distributing servers transmit the data between the distributing servers according to a load balance of the distributing servers.

With the unique and unobvious structure of the present invention, the distributing capability of the system is changed dynamically to follow the requests from the clients.

BRIEF DESCRIPTION OF THE DRAWINGS

The above-mentioned and other objects, features and advantages of this invention will become more apparent by reference to the following detailed description of the invention taken in conjunction with the accompanying drawings in which:

FIG. 3 is a view showing one example of a content table in the preferred embodiment of the present invention;

DETAILED DESCRIPTION OF THE PREFERRED EMBODIMENT

Description will be given of a preferred embodiment of the data distribution system of the present invention in detail with reference to the accompanying drawings.

Figure 1:
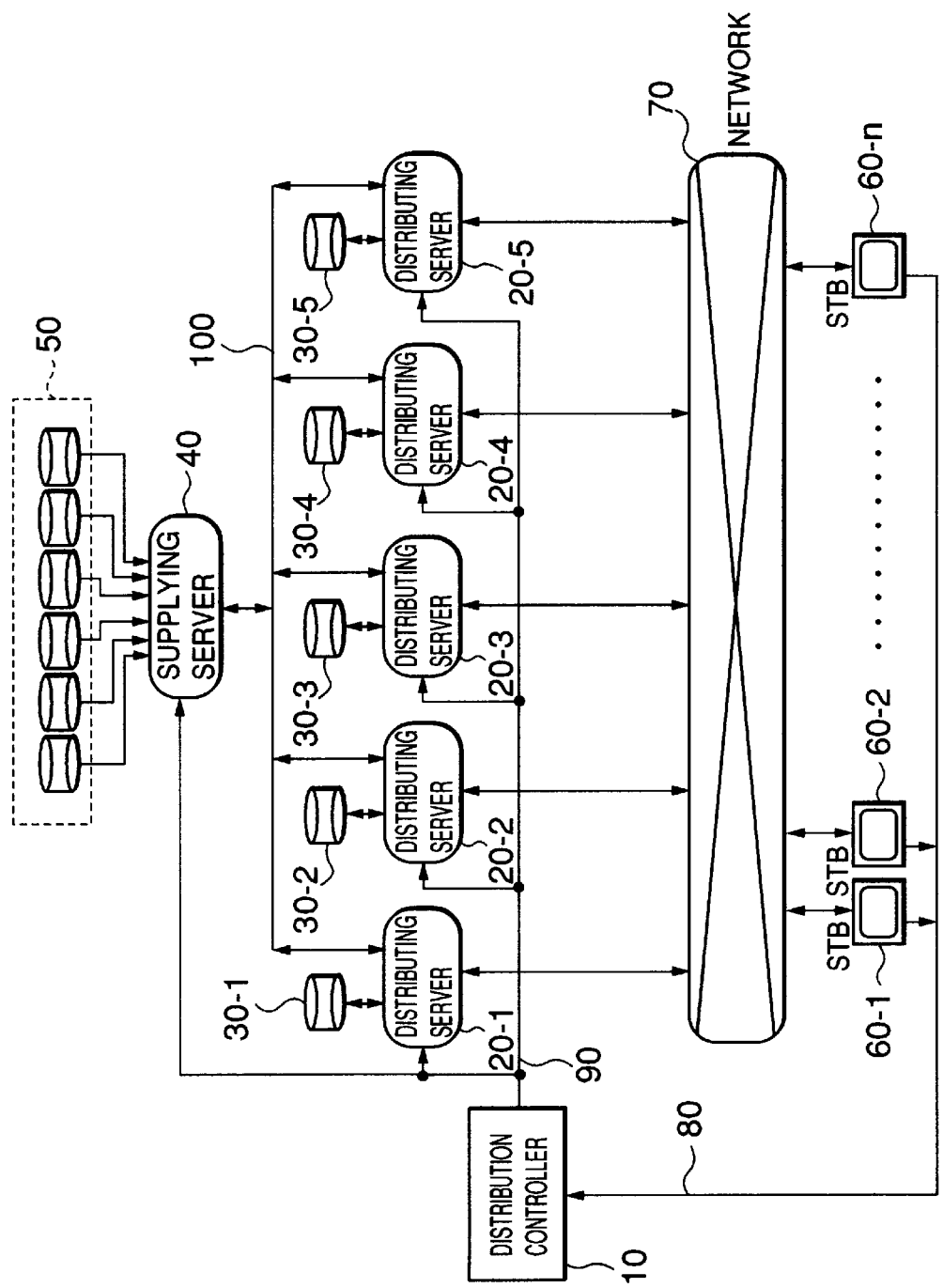
FIG. 1 is a block diagram showing the configuration of a preferred embodiment of a data distribution system according to the present invention.

Referring to FIG. 1 showing an embodiment of the invention, a data distribution system has distributing servers 20-1, . . . , 20-k ($1 \leq k \leq 5$) for transmitting multi-media data (i.e., image data) to set top boxes ("STB") 60-1, . . . , 60-n (n is a natural number) via a network 70. Disc units 30-1, . . . , 30-k are connected to the distributing servers 20, respectively. Each of the disc units 30 stores the multi-media data.

The data distribution system has a supplying server 40 and a secondary disc unit 50 connected to the supplying server 40. The secondary disc unit 50 stores multi-media data. The data distribution system has a distribution controller 10 for requesting data transmission of a distributing server 20 and the supplying server 40 in response to STB 60.

In this embodiment, it is assumed that both the number of the distributing servers and the number of operable streams of each of the distributing servers are "5" for clarity of explanation.

Figure 2:
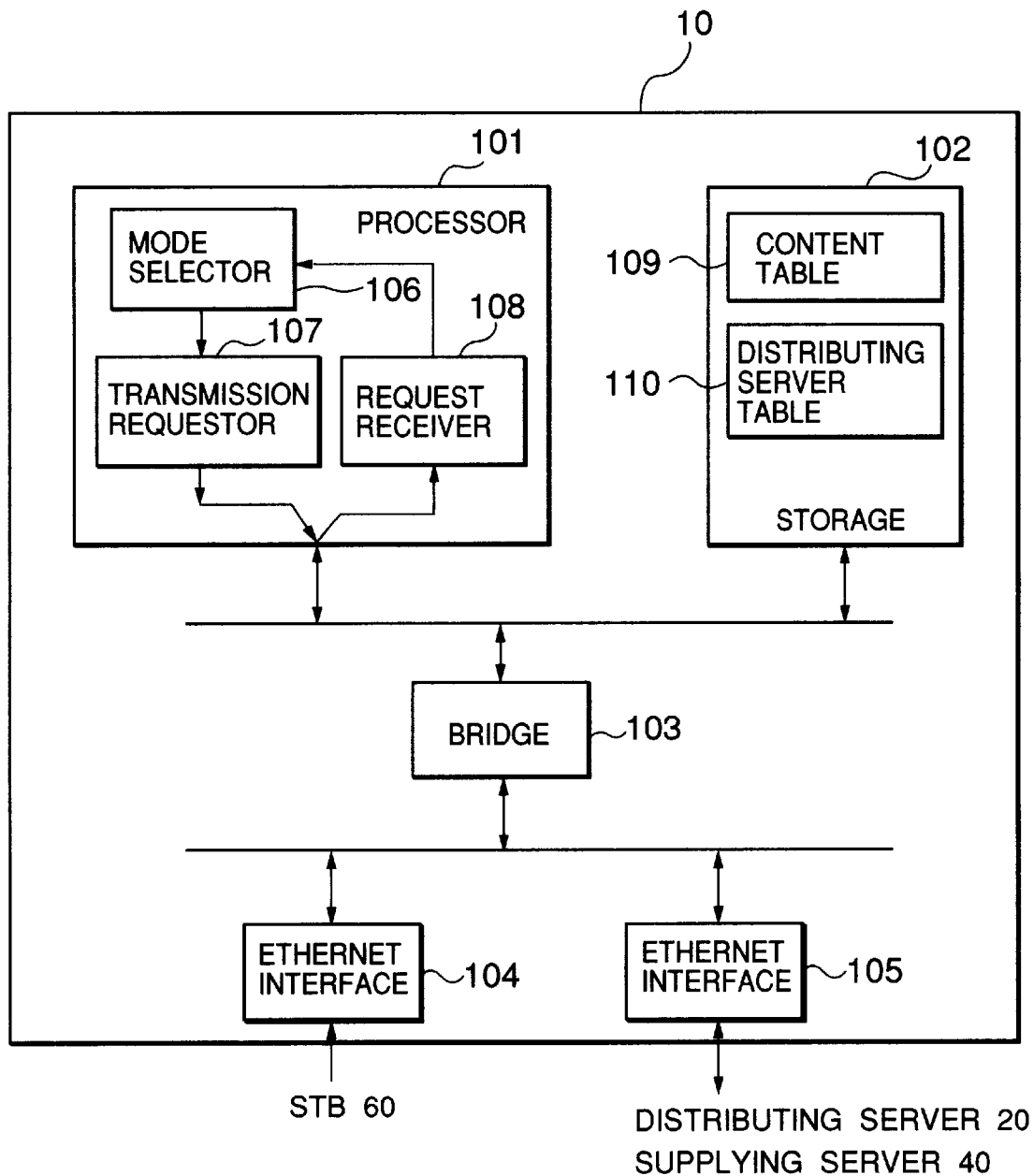
FIG. 2 is a block diagram showing the configuration of a distribution controller in the preferred embodiment of the present invention.

Referring to FIG. 2, the distribution controller 10 has a processor 101, a storage 102, a bridge 103, Ethernet interfaces 104 and 105.

The processor 101 has a request receiver 108 for receiving a request from STB 60, a mode selector 106 for selecting an operation mode corresponding to the received request, and a transmission requester 107 for transmitting one of a distributing instruction and a transmission instruction. The distribution instruction is used for distributing data from the distribution server 20 to the STB 60. The transmission instruction is used for transmitting data from the supplying server 40 to the distributing server 20. The transmission instruction is also used for transmitting data between the distributing servers 20.

The storage 102 includes a content table 109 and a distributing server table 110. The content table 109 stores a content number and information with respect to the distributing servers 20. The distributing server table 110 stores the present number of streams with respect to each of the distributing servers 20 and a remaining file capacity.

The Ethernet interface 104 is connected to STB 60. The Ethernet interface 104 performs a data transmission between the distribution controller 10 and STB 60.

The Ethernet interface 105 is connected to the distributing server 20 and the supplying server 40. The Ethernet interface 105 performs a data transmission between the distribution controller 10 and one of the distributing server 20 and the supplying server 40.

Referring to FIG. 3, the content table 109 contains the content number, a content name, a time length and information indicating in which distributing server 20 each content is included according to the content number. The content of the content name "A" is stored in the distributing servers 20-1, 20-2 and 20-5. The content of the content name "B" is not stored in any distributing server 20. The content of the content name "C" is stored only in the distributing server 20-5.

Figure 4:
FIG. 4 is a view showing one example of a distributing server table in the preferred embodiment of the present invention.

Referring to FIG. 4, the distributing server table 110 stores pairs of the present number of streams and the vacant file capacity of each of the distributing servers 20 in response to the distributing servers 20. It is apparent that the signal distributing server 20-1 shows that the present number of streams is "5" and reaches a limit of the transmission capacity. It is apparent that although the distributing server 20-2 shows that the present number of streams being operated is "3", the remaining file capacity is "0 GB" and the remaining file capacity reaches the limitation.

Figure 5:
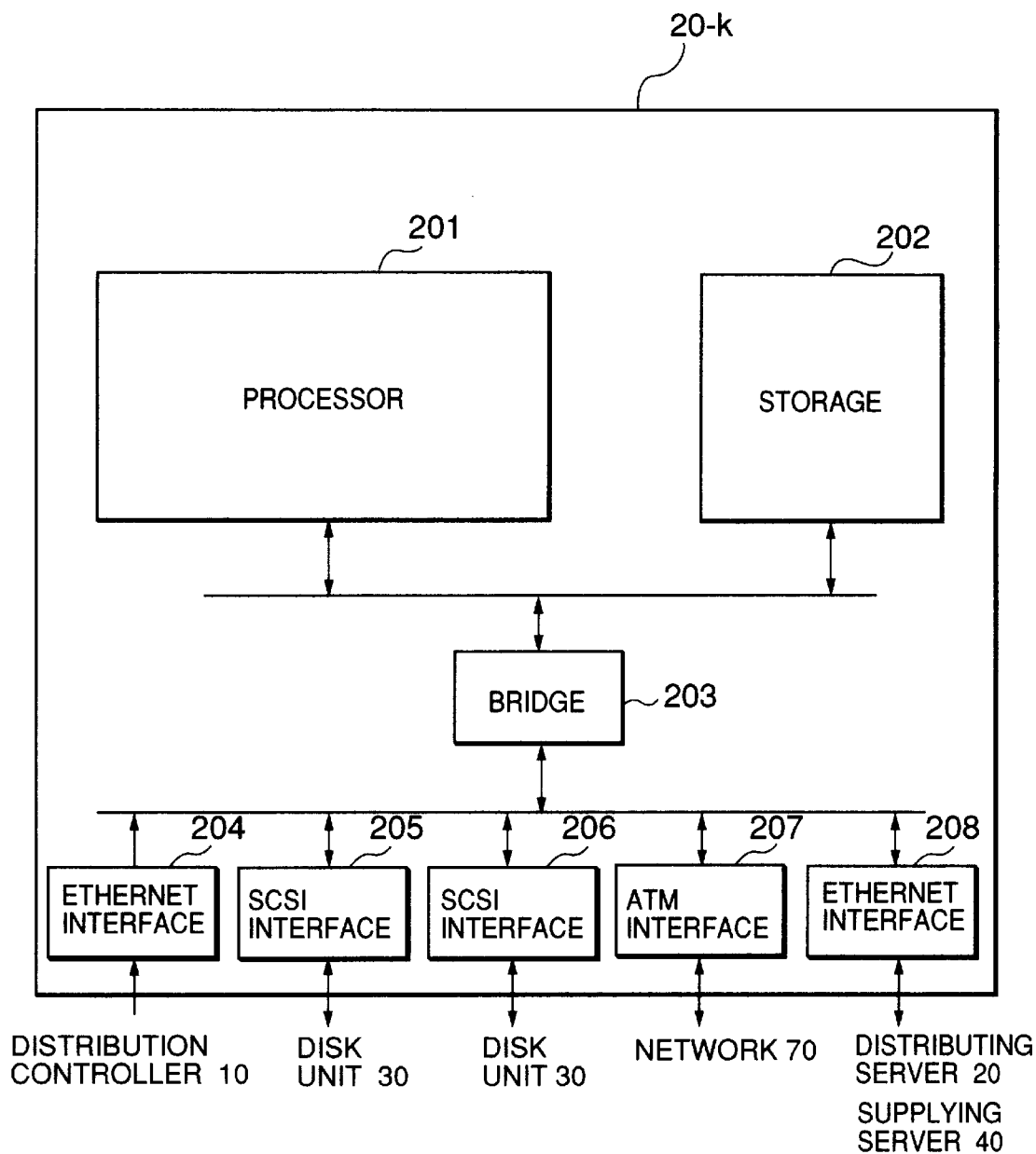
FIG. 5 is a block diagram showing the configuration of a distributing server in the preferred embodiment of the present invention.

Referring to FIG. 5, the distributing server 20-k has a processor 201, a storage 202, a bridge 203, an ethernet interface 204, SCSI interfaces 205 and 206, an ATM interface 207, and an Ethernet interface 208.

The processor 201 receives an instruction from the distributing controller 10 and controls a transmission of data.

The storage 202 stores content data in case of the data distribution and the data transmission.

The Ethernet interface 204 is connected to the distribution controller 10 and receives an instruction from the distribution controller 10. The SCSI interfaces 205 and 206 are connected to a corresponding disc unit 30 so as to perform the data transmitting and receiving operation. The ATM interface 207 transmits data to STB 60. The Ethernet interface 208 is connected to another distributing server 20 and the supplying server 40. The Ethernet interface 207 controls the data transmission between the distributing server 20 and one of another distributing server 20 and the supplying server 40.

Figure 6:
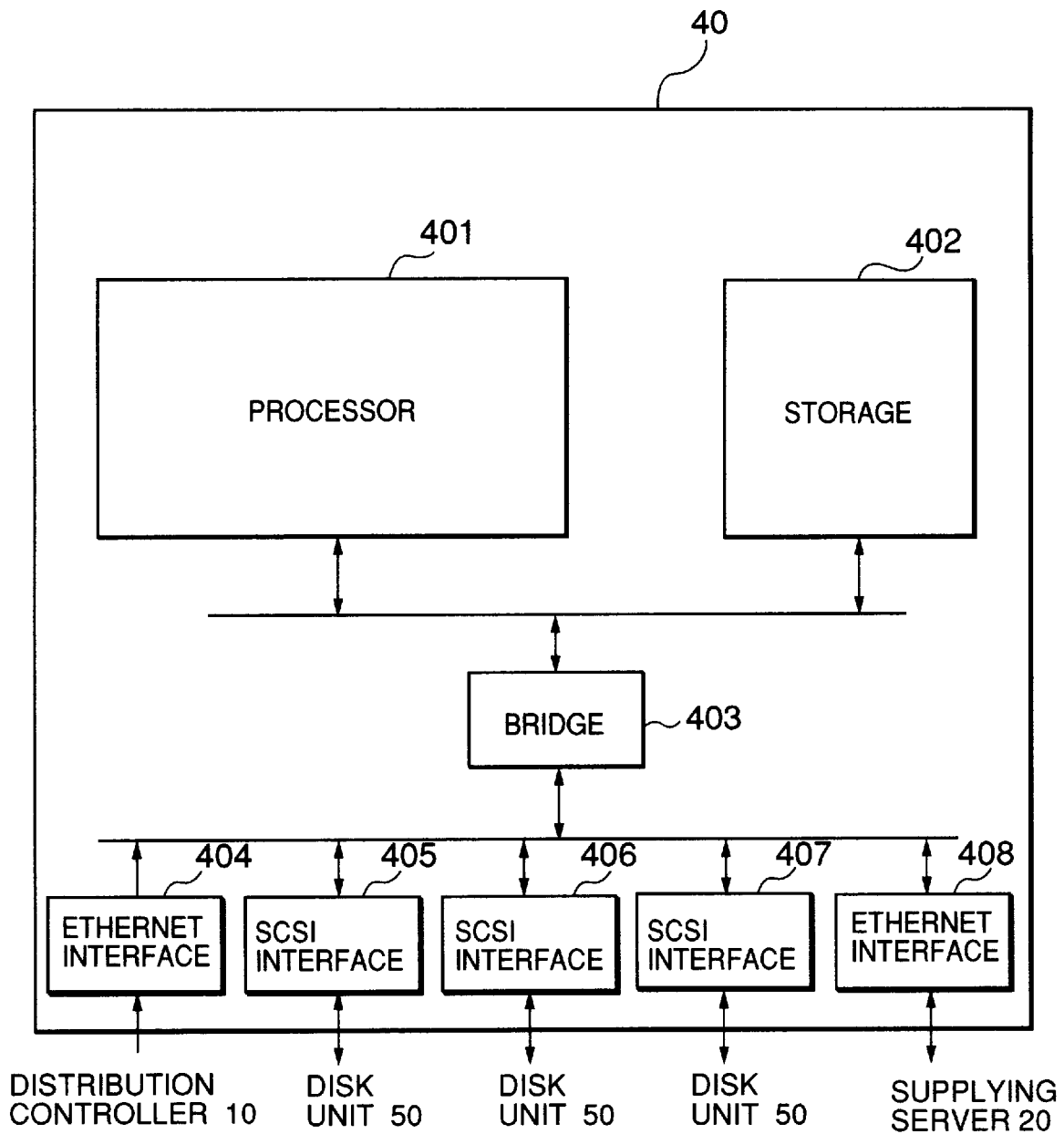
FIG. 6 is a block diagram showing the configuration of a supplying server in the preferred embodiment of the present invention.

Referring to FIG. 6, the supplying server 40 has a processor 401, a storage 402, a bridge 403, Ethernet interfaces 404 and 408, SCSI interfaces 405, 406 and 407.

The processor 401 receives an instruction from the distribution controller 10 and controls the data transmission.

The storage 402 stores content data when the content data are transmitted to the distributing server 20. In addition, the memory 402 stored the data read out from the secondary disc unit 50.

The Ethernet interface 404 is connected to the distribution controller 10 and receives an instruction from the distribution controller 10. The SCSI interfaces 405, 406 and 407 are connected to the secondary disc unit 50 and transmit data. The Ethernet interface 408 is connected to the distributing server 20 and transmits data to the distributing server 20.

Hereinbelow and referring to FIGS. 1 through 9, the operation of the data distribution system in accordance with the above-mentioned embodiment of the present invention will be described.

Figure 7:
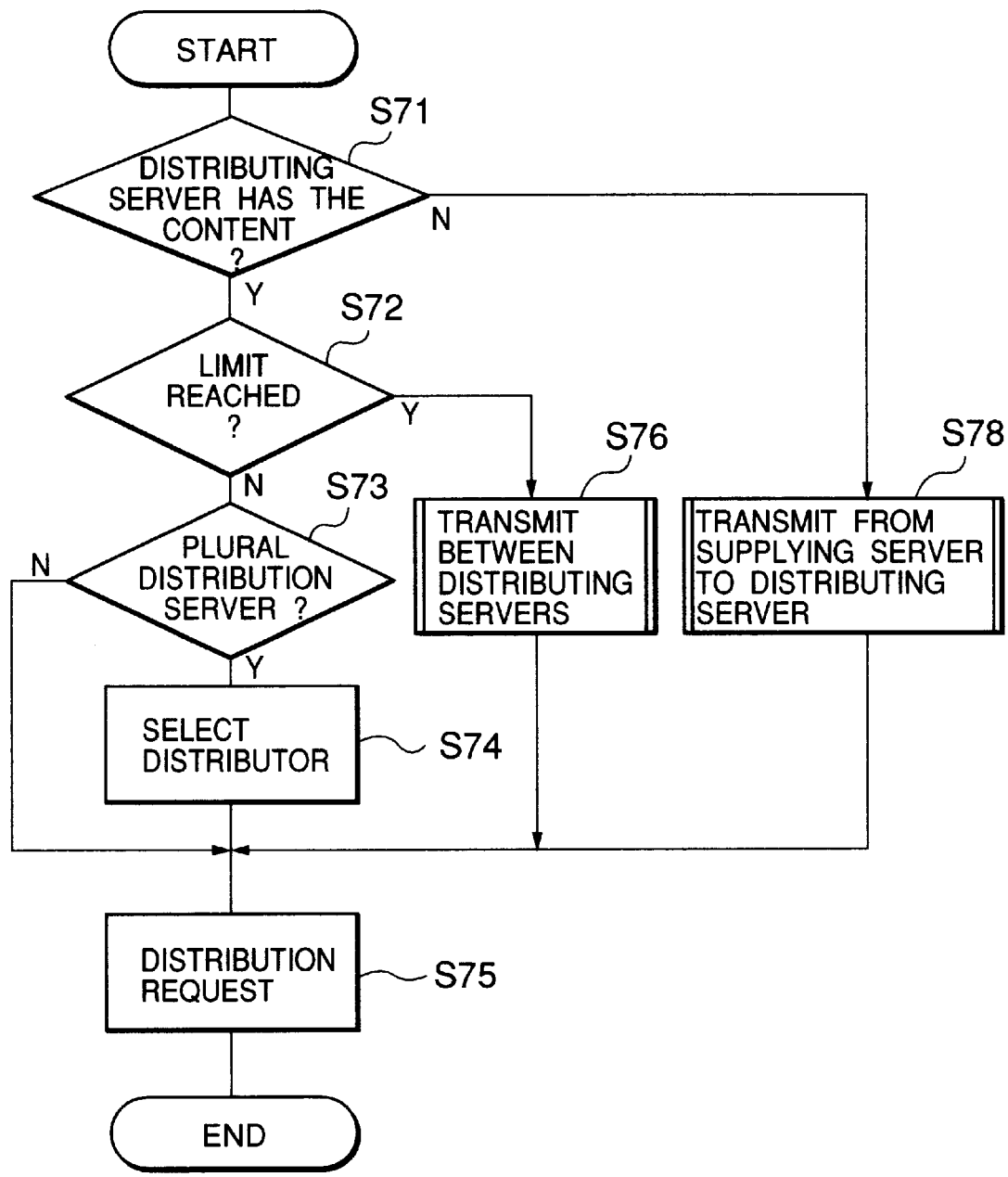
FIG. 7 is a flow chart showing the operation of the data distribution system according to the present invention.

Referring to FIG. 7, in the case that the STB 60-1 requests content transmission for the distribution controller 10, it is judged in reference to the content table 109 whether or not there is a distributing server 20 including the content (in step S71). If there is a distributing server 20 including the content, it is judged from the number of streams in the distributing server table 110 whether or not the distributing server reaches the limitation of the distribution capacity (in step S72).

If it is judged that the distributing server does not reach the limitation of the distribution capacity in step S72, it is further judged whether or not the number of distributing server 20 is plural (in step S73). If the number is judged to be plural, the distributing server having the maximum number of remaining streams is selected as a distributor for distributing data to the STB 60 (in step S74). After that, a request for distributing the content from the distributor (in step S75) is carried out.

In step S72, if all the distributing servers including the content reach to a limitation of distribution, a transmission between the distributing servers is carried out (in step S76).

In step S71, if it is found that there is no presence of the distributing server containing the content, a transmission from the supplying server 40 to the distributing server 20 is carried out (in step S78).

Figure 8:
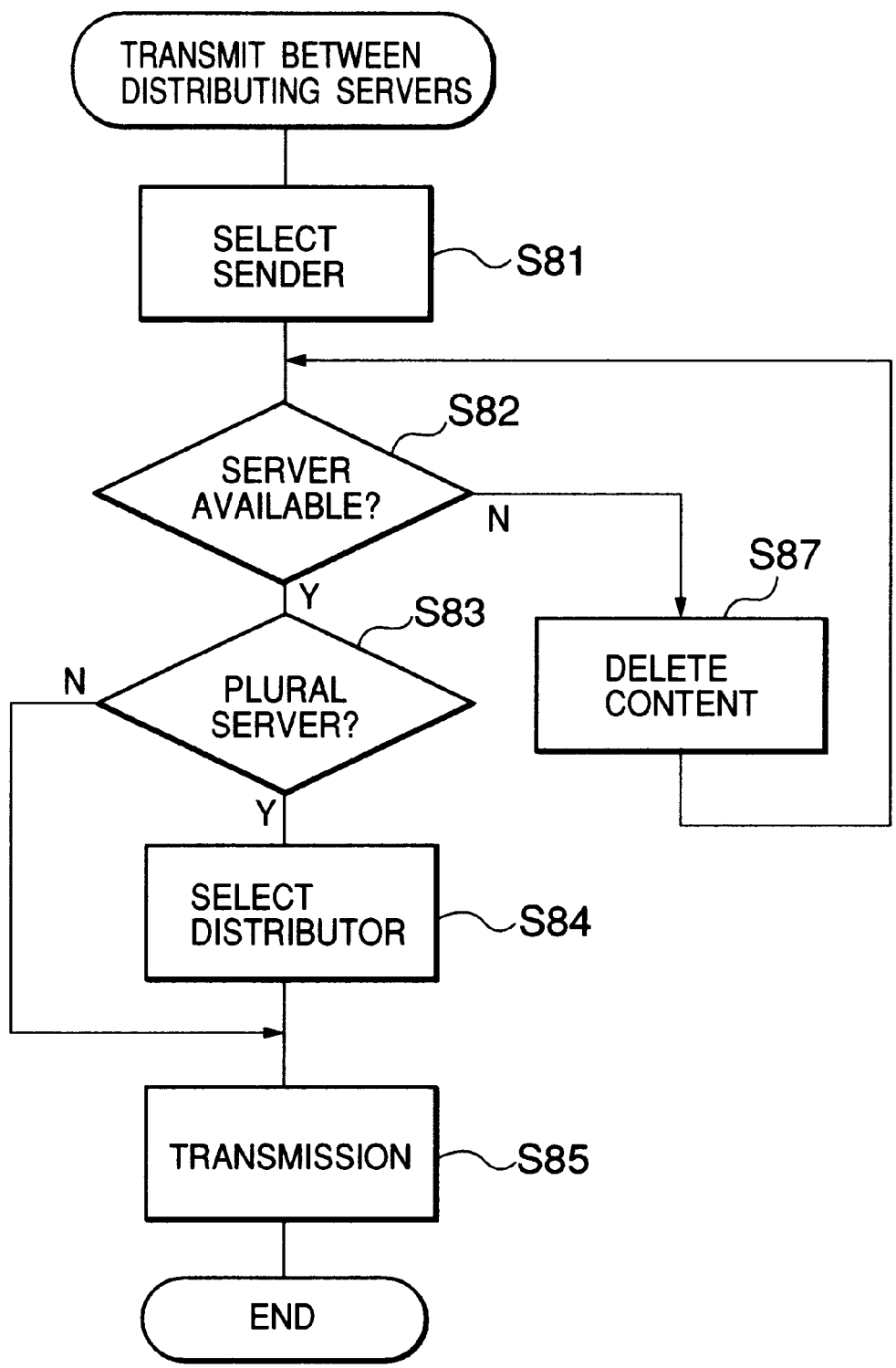
FIG. 8 is a flow chart showing the operation of data transmission between the distributing servers in the preferred embodiment of the present invention.

Referring to FIG. 8, in step S76 of FIG. 7, the data transmission between distributing server 20 is performed as follows. The distributing server 20 which stores the content to be transmitted is selected as a sender (in step S81). With the distributing server table 110 of the distributing server other than the distributing server 20 selected in step S81, it is judged whether or not a distributable and transmittable distributing server is present in reference to the number of streams and the remaining file capacity (in step S82).

In the case that the remaining capacity of the disk unit 30 of the distributing server 20 is not "0", this distributing server can perform a transmission operation. When there is a single distributing server which can distribute and transmit the data, it is judged if the number is plural (in step S83) and if the number is plural, the distributing server having the maximum number of streams is selected as the distributor (in step S84). The number of streams can be obtained as the number in which the number of streams being operated at present is subtracted from the maximum number of streams. If the distributor is selected, a request for transmitting the content from the sender to the distributor is carried out (in step S85).

In step S83, if there is a single server which can distribute the data, the transmission from sender to the distributing server is carried out (in step S85).

In step S82, in the case that there is no distributing server which can distribute and transmit a signal, an operation for deleting the content in the distributing server is performed (in step S87). After deleting the content within the distributing server, the operation returns to that of step S82.

For example, referring to FIG. 3, in the case that STB 60 requests content named "G" to the distribution controller 10, the content "G" is stored only in the distribution server 20-1 according to the content table 109 (step S71 in FIG. 7). Referring to FIG. 4, the distribution server 20-1 already has reached the limitation of the number of streams according to the distribution server table 110 (step S72 in FIG. 7). Therefore, in this case, the transmission between the distribution servers is necessary (step S76 in FIG. 7).

The distributing server 20-1 containing the content "G" is selected as a sender (in step S81 in FIG. 8). The distribution servers 20-3 and 20-5 are selected as a candidate of a distributor according to the distribution server table 110 (step S82 in FIG. 8). In this case, the distribution server 20-3 is selected as a distributor because the distribution server 20-3 has the most available streams (step S84 in FIG. 8). Therefore, the transmission from the distribution server 20-1 to the distribution server 20-3 is carried out (step S85 in FIG. 8).

The distributing controller 10 issues the request to the distributing server 20-1 for requesting a transmission of the content "G" to the distributing server 20-3. This transmission is realized by a usual file transmission protocol. Under this file transmission protocol, a connection is established between the sender and the receiver (distributor). After establishing the connection, the data transmission is carried out.

Referring to FIG. 5, the request of transmission by the distribution controller 10 is sent to the distributing server 20-1. The request is stored in the storage 202 via the Ethernet interface 204 and the bridge 203. According to the request, the storage 202 stores a file type, a source address and a destination address. The processor 201 monitors the storage 202 by polling. The processor 201 acknowledges that the request is stored at a timing within a range of certain polling interval. The processor 201 selects the source from the source address stored in the storage. If the content to be transmitted is stored in a disk unit 30-1 connected to the SCSI interface 205, the processor reads the content from the disk unit 30-1 via the SCSI interface 205 and stores the content to the storage 202. The processor 201 sends out the content stored in the storage 202 via the bridge 203 and the Ethernet interface 208.

In the distributing server 20-3 acting as the distributor, the content inputted through the Ethernet interface 208 is stored in the storage 202 via the bridge 203. Data stored in the storage 202 is transmitted to one of the SCSI interface 205 and 206 via the bridge 203 and then the content is stored in the disk unit 30-3. A reason why the content is stored in the storage 202 in the distributing servers 20-1 and 20-3 is that a synchronization is required between the transmission timings of the Ethernet and SCSI.

Figure 9:
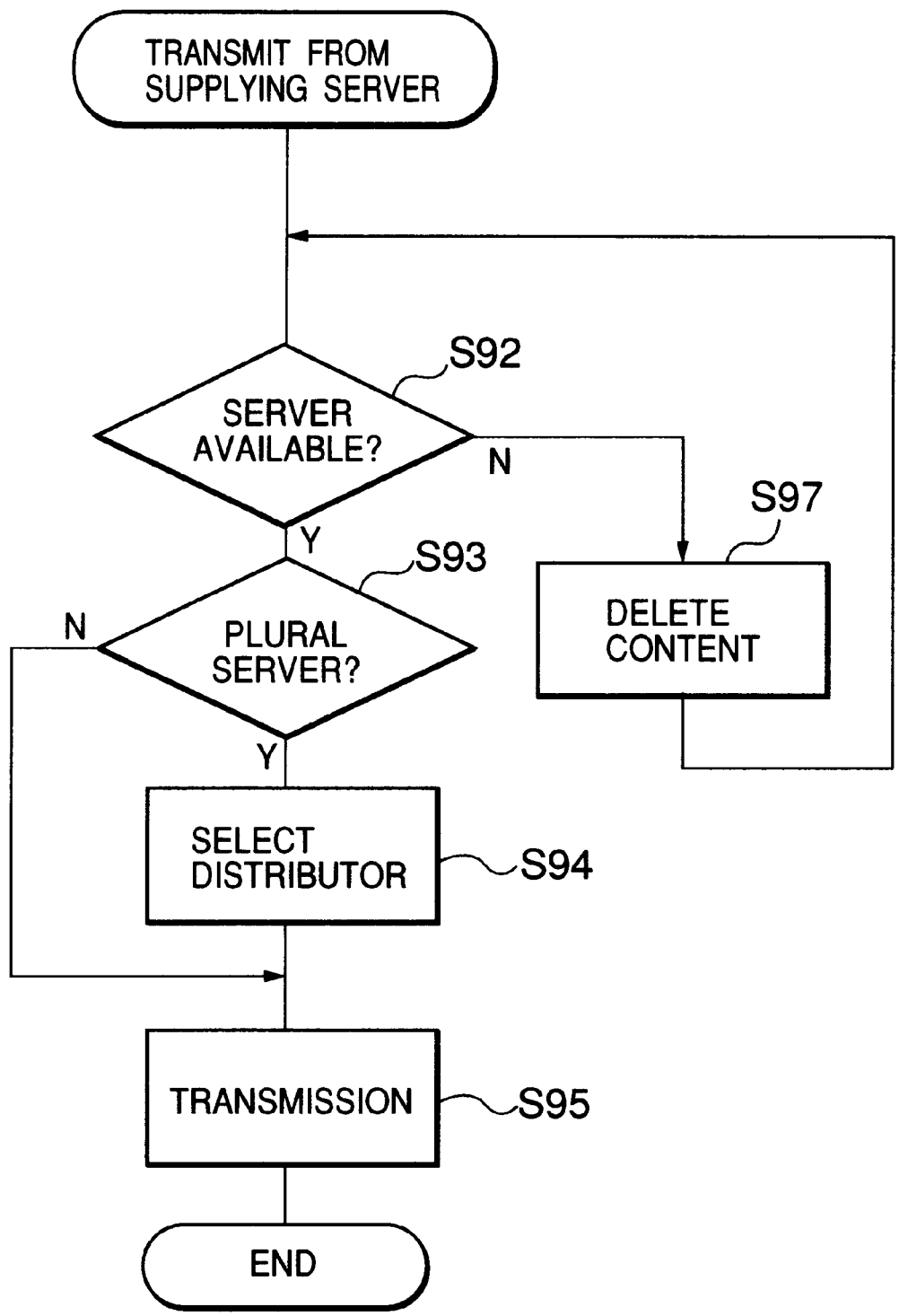
FIG. 9 is a flow chart showing the operation of data transmission from the supplying server to the distributing servers in the preferred embodiment of the present invention.

Referring to FIG. 9, in the case that the content is not stored in any distribution server 20 in step S71 of FIG. 7, the transmission from the supplying server 40 to the distributing server 20 is performed. It is judged whether or not the distributing server which can distribute and transmit a data is present in reference to the number of streams and the remaining file capacity (in step S92). When there is the distributing server which can distribute and transmit a data, it is judged whether or not the number is plural (in step S93) and if the number is plural, the distributing server having the maximum available number of streams is selected as the distributor (in step S94). The content is transmitted from the supplying server 40 to the distributor (in step S95). In step S93, if the number of server which can distribute and transmit a data is single, the content is transmitted from the supplying server 40 to the distributing server 20 in step S95.

If it is judged that the distributing server which can distribute and transmit a data is not present, unnecessary content in the distributing server 20 is deleted (in step S97). After the content in the distributing server 20 is deleted, the operation is returned back to the operation in step S91.

For example, referring to FIG. 3, in the case that the STB 60-1 requests the content named "B" to the distribution controller 10, the content "B" is not stored in any distribution server 20 according to the content table 109 (step S71 in FIG. 7). Therefore, in this case, the transmission from the supplying server 40 to the distribution server 20 is necessary (step S78 in FIG. 7).

The distribution servers 20-3 and 20-5 are selected as a candidate of a distributor according to the distribution server table 110 (step S92 in FIG. 9). In this case, the distribution server 20-3 is selected as a distributor because the distribution server 20-3 has the most available streams (step S94 in FIG. 9). Therefore, the transmission from the supplying server 40 to the distribution server 20-3 is requested (step S95 in FIG. 9).

The distributing controller 10 issues the request to the distributing server 20-1 for requesting a transmission of the content "B" to the distributing server 20-3. This transmission is realized by a usual file transmission protocol. Under this file transmission protocol, a connection is established between the sender and the receiver (distributor). After establishing the connection, the data transmission is carried out.

Referring to FIG. 6, the request of transmission by the distribution controller 10 is sent to the supplying server 40. The request is stored in the storage 402 via the Ethernet interface 404 and the bridge 403. According to the request, the storage 402 stores a file type, a source address and a destination address. The processor 401 monitors the storage 402 by making a polling. The processor 401 acknowledges that the request is stored at a timing within a range of certain polling interval. The processor 401 selects the source from the source address stored in the storage. If the content to be transmitted is stored in a disk unit 50 connected to the SCSI interface 405, the processor reads the content from the disk unit 50 via the SCSI interface 405 and stores the content to the storage 402. The processor 401 sends out the content stored in the storage 402 via the bridge 403 and the Ethernet interface 408.

In the distributing server 20-3 acting as the distributor, the content inputted through the Ethernet interface 208 is stored in the storage 202 via the bridge 203. Data stored in the storage 202 is transmitted to one of the SCSI interface 205 and 206 via the bridge 203 and then the content is stored in the disk unit 30-3. A reason why the content is stored in the storage 202 in the distributing servers 20-1 and 20-3 is that a synchronization is required between the transmission timings of the Ethernet and SCSI.

Figure 10:
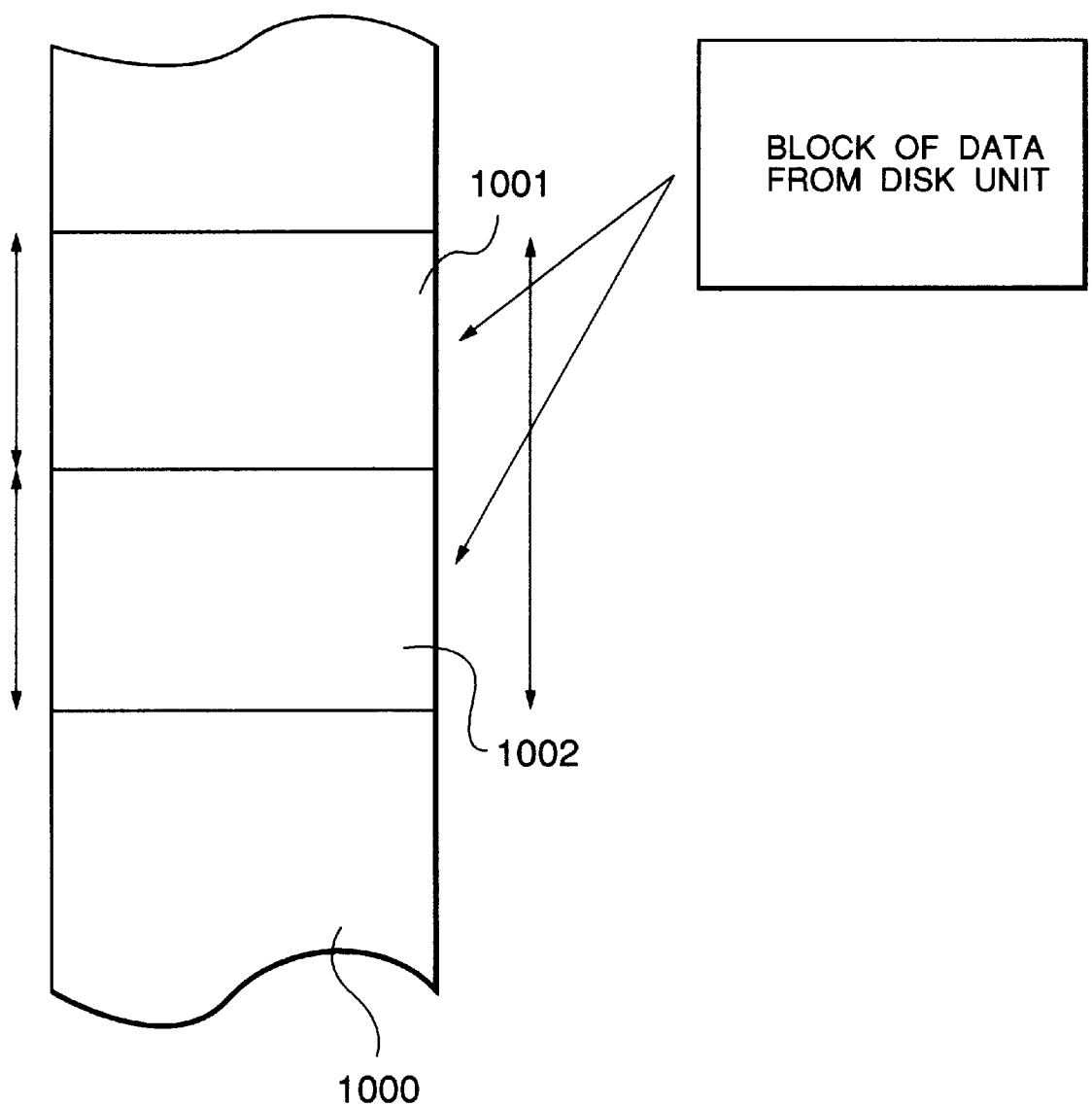
FIG. 10 is a view showing one example of memory allocation of blocks of data from disk units in the preferred embodiment of the present invention.

Referring to FIG. 10, an area of the storage 202 is allocated for each stream during the data transmission. The memory area allocated for each stream is divided into areas 1001 and 1002. The areas 1001 and 1002 have the same size which is larger than a block size of data read out from the disc unit 30. Here, the content is read out and transmitted from the disk unit in one of the distributing server and the supplying server in a specified data amount unit. This unit is called as a "block".

The processor 201 alternatively stores the received block data into the area 1001 and the area 1002. At the time of completion of the writing operation for the area 1001, a writing operation for the area 1002 is started. At this time, since the writing operation for the area 1001 is not already present, data is read out from the area 1001 so as to perform a stream distribution to the STB 60. At this time, the data in the area 1001 is concurrently transmitted into the disk unit 30 connected to the distributing server 20. Upon completion of the writing operation for the area 1002, the processor 201 performs again the writing operation for the area 1001. Therefore, the area 1001 and the area 1002 are accessed (written-in and read-out) simultaneously.

Since the writing operation for the data into the area 1001 and 1002 must assure uninterrupted reading operation for these areas so as to prevent any variance of transmission rate, the writing operation for another area should be finished before the reading operation is completed. That is, a faster writing operation than the reading operation in the area is carried out. If in the case that there is a certain variance in time for the writing operation and a lower limit in variance has a longer time than the time required for the reading operation, the two areas 1001 and 1002 must be expanded up to a size more than 3 areas until variance can be accommodated.

In the preferred embodiment, when the number of operating streams of the distributing servers reaches a limitation, the content has been transmitted from the distributing server to another distributing server, the supplying server 40 may transmit the content to another distributing server.

As described above, according to the preferred embodiment of data distributing system of the present invention, there are provided a plurality of distributing servers 20-k ($1 \leq k \leq 5$) and a supplying server 40 connected to each of the plurality of distributing servers 20, and in the case that there is a request of content not included in the disk unit 30-k for the distributing server 20-k, the content is transmitted from the supplying server 40 to the distributing server 20-k and concurrently the content is distributed from the distributing server 20 to the STP 60. Due to this fact, it is possible to change dynamically the distributing capacity of the data distribution system.

Moreover, the area of the storage in the distributing server 20-k has been divided into the areas 1001 and 1002. When the writing operation is being carried out in the area 1001, the read operation is carried out from the area 1002 and when the read operation from the area 1002 is completed, the read operation from the area 1001 is performed and the write operation is performed for the area 1002. Due to this fact, it is possible to perform a distribution in concurrent with the storing of the content.

As is apparent from the above description, according to the present invention, there are provided a plurality of distributing servers having a disk unit and a supplying server connected to each of a plurality of distributing servers, and when there is a request for content not included in the disk unit of the distributing server, the content is transmitted from the supplying server to the distributing server and concurrently the content is distributed from the distributing server to the requesting STB. Due to this fact, it is possible to change dynamically the distributing capability of the system.

While the invention has been described in terms of a preferred embodiment, those skilled in the art will recognize that the invention can be practiced with modification within the spirit and scope of the appended claims.

What is claimed is:

1. A data distribution system comprising:

a plurality of disc units for storing data; and a plurality of distributing servers, connected to said plurality of disc units, respectively, for serving content data stored in a connected one of said plurality of disc units, said plurality of distributing servers directly transmitting said content data between said distributing servers according to a dynamic load balance of said distributing servers, wherein the content data is distributed from a receiving distributing server to a client concurrently with the storing of said content data in the receiving distributing server, when said content data is transmitted between said distributing servers.

2. The data distribution system according to claim 1, wherein said dynamic load balance is determined on the basis of remaining file capacity of said distributing servers.

3. The data distribution system according to claim 1, wherein said dynamic load balance is determined on the basis of a number of available streams of said distributing servers.

4. The data distribution system according to claim 1, further comprising a supplying server for supplying the content data to said distributing servers, wherein the content data is distributed from the receiving distributing server to a client concurrent with the storing of said content data in the receiving distributing server, when said content data is transmitted from said supplying server to said receiving distributing server.

5. A data distribution system, comprising:

a plurality of disc units for storing data;

a plurality of clients;

a plurality of distributing servers, connected to said plurality of disc units, respectively, that directly transmit content data stored in a connected one of said plurality of disc units between said plurality of distributing servers; and a distribution controller that selects one of said plurality of distributing servers as a distributor for distributing said content data to one of said plurality of clients according to a dynamic load balance of said plurality of distributing servers, wherein the content data is distributed from the distributor to one of said plurality of clients concurrent with the storing of said content data in the distributor, when said content data is transmitted between said distributing servers.

6. The data distribution system according to claim 5, said distribution controller comprising a content table for storing information about correspondence between said distributing servers and said content data, said distribution controller selecting said distributor based on said content table.

7. The data distribution system according to claim 5, further comprising:

a supplying server for serving the content data to said distributor according to said load balance of said distributing servers, wherein the content data is distributed from the distributor to one of said plurality of clients concurrent with the storing of said content data in the distributor, when said content data is transmitted from said supplying server to said distributor.

8. The data distribution system according to claim 7, wherein one of said plurality of disc units is divided into at least two areas, and said at least two areas are accessed simultaneously.

9. The data distribution system according to claim 5, further comprising a supplying server, wherein said supplying server supplies said content data to the selected one of said distributing servers based on a control signal sent from said distribution controller.

10. The data distribution system comprising:

a plurality of disc units for storing data;

a plurality of clients;

a plurality of distributing servers, connected to said plurality of disc units, respectively, that directly transmit content data stored in a connected one of said plurality of disc units between said plurality of distributing servers; and a distribution controller for selecting one of said plurality of distributing servers as a distributor for distributing said content data to one of said plurality of clients according to a dynamic load balance of said plurality of distributing servers, said distribution controller comprising a content table for storing information about correspondence between said distributing servers and said content data, said distribution controller selecting said distributor based on said content table, said distribution controller further comprising a distribution server table for storing information about said load balance of said distributing servers, said distribution controller selecting said distributor based on said content table and said distributing server table, wherein the content data is distributed from the distributor to one of said plurality of clients concurrent with the storing of said content data in the distributor, when said content data is transmitted between said distributing servers.

11. The data distribution system according to claim 10, wherein said dynamic load balance is determined on the basis of remaining file capacity of said distributing servers.

12. The data distribution system according to claim 10, wherein said dynamic load balance is determined on the basis of a number of available streams of said distributing servers.

* * * * *